United States Patent
Royle et al.

[15] 3,664,360
[45] May 23, 1972

[54] FLUID FLOW CONTROL DEVICES

[72] Inventors: Joseph Kenneth Royle, Bakewell; John Grant, Risley; Jack Alexander Golder, Lower Walton, all of England

[73] Assignee: United Kingdom Atomic Energy Authority, London, England

[22] Filed: June 15, 1970

[21] Appl. No.: 45,963

[30] Foreign Application Priority Data

June 25, 1969  Great Britain...............32,202/69

[52] U.S. Cl. ....................................................137/81.5
[51] Int. Cl. ......................................................F15c 1/04
[58] Field of Search...........................................137/81.5

[56] References Cited

UNITED STATES PATENTS

| | | | |
|---|---|---|---|
| 3,515,158 | 6/1970 | Utz | 137/81.5 |
| 3,276,259 | 10/1966 | Bowles et al. | 137/81.5 X |
| 3,267,946 | 8/1966 | Adams et al. | 137/81.5 |
| 3,182,675 | 5/1965 | Zilberfarb et al. | 137/81.5 |
| 3,198,214 | 8/1965 | Lorenz | 137/81.5 |
| 3,324,891 | 6/1967 | Rhoades | 137/81.5 X |
| 3,343,790 | 9/1967 | Bowles | 137/81.5 X |
| 3,481,352 | 12/1969 | Starr | 137/81.5 |
| 3,519,008 | 7/1970 | Fish | 137/81.5 |

*Primary Examiner*—Samuel Scott
*Attorney*—Larson, Taylor and Hinds

[57] ABSTRACT

A vortex amplifier with a chmber having co-axial inlet and outlet ducts. In the chamber is disposed a flow shaper body which confines fluid flow through the chamber to the outer part of the chamber. Flow directing means such as vanes are also disposed in the chamber so as to impart a rotary component of flow to fuild passing through the chamber. Control ports direct a control flow of fluid tangentially into the chamber to interact with fluid flow to which a rotary component has been applied.

6 Claims, 3 Drawing Figures

PATENTED MAY 23 1972

3,664,360

FLUID FLOW CONTROL DEVICES

BACKGROUND OF THE INVENTION

This invention relates to fluid flow control devices.

It is known to control fluid flow by producing a vortex in the fluid such that the pressure drop due to centrifugal forces, acting from the center to the periphery of the vortex, operates to oppose the main flow of fluid. Devices to utilize this effect are termed vortex amplifiers. Vortex amplifiers generally comprise a chamber which is similar to a shallow cylinder. The main fluid flow is introduced into the cylinder via a radial duct and the main outlet for the fluid is an axial duct. This arrangement means that the flow direction changes by 90° and therefore the inclusion of this device is process plant or equipment requires that a right angled bend is introduced which is inconvenient.

SUMMARY OF THE INVENTION

According to the present invention there is provided a vortex amplifier comprising a chamber having co-axial inlet and outlet ducts, in which chamber is disposed a flow shaper body which confines fluid flow through the chamber to the outer part of said chamber, flow directing means, disposed in the chamber to impart a rotary component of flow to fluid passing through the chamber, and at least one control port which may also form part of said flow directing means for directing a control flow of fluid tangentially into the chamber to interact with fluid flow to which a rotary component has been applied by said flow directing means.

The flow directing means are preferably vanes mounted about the flow shaper body. The angle of the vanes may be variable by external controls.

DESCRIPTION OF THE DRAWINGS

An embodiment of the invention will now be described, by way only of example, with reference to the accompanying drawings in which.

DESCRIPTION OF THE PREFERRED EMBODIMENTS

Figure 1:
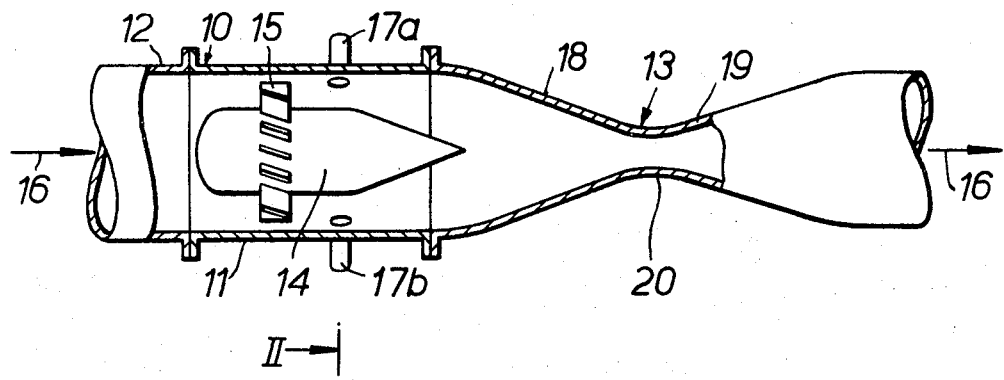
FIG. 1 is a diagrammatic side view in medial section of a vortex amplifier according to the invention.
Figure 2:
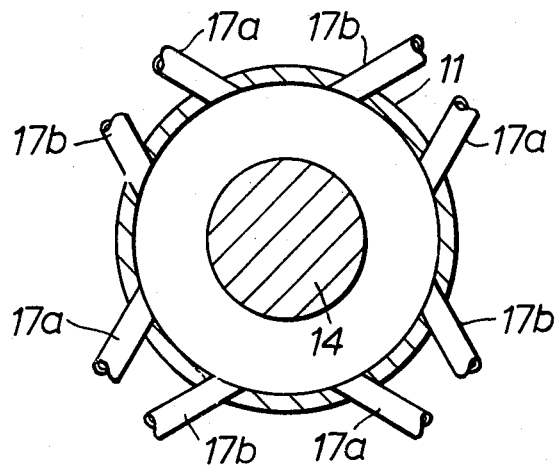
FIG. 2 is an end view in section on line II—II of FIG. 1.

FIG. 1 shows, a vortex amplifier 10 comprising a circular section vortex chamber 11 having an inlet 12 and an outlet 13 arranged co-axially, the inlet 12 being of the same diameter as the chamber 11. The chamber 11 has supported co-axially in it a streamline flow shaper body 14 which has mounted around it flow directing means in the form of vanes 15 inclined to the longitudinal axis of chamber 11. Main fluid flow through the amplifier is in the direction of arrows 16. In the chamber 11 and downstream of the vanes 15, sets 17a, 17b, of control ports are provided, each set being disposed symmetrically around the periphery of the chamber 11. As shown in FIG. 2 the sets 17a, 17b, are adapted to direct flow control flows tangentially into the vortex chamber: set 17a providing for directing clockwise control flow and set 17b providing for an anti-clockwise flow. Outlet 13 from the chamber 11 has a converging flow section 18 followed by a throat 20 and a diverging flow section 19.

In operation, a main fluid flow passes through the chamber 11 in the direction of arrows 16 by way of inlet 12 and outlet 13. The flow shaper body 14 causes the main fluid flow to flow in the outer annulus of chamber 11 in which region it has imposed on it by the vanes 15 a rotary component of flow relative to the longitudinal axis of the chamber. Typically, as shown in FIG. 1 and 2, the rotation imposed by vanes 15 will impart clockwise rotation (as seen in FIG. 2) to the flow. If now a control flow is applied by way of the control ports of set 17a the clockwise rotation of the fluid downstream of vanes 15 is increased. As the spinning fluid enters the converging section 18 of outlet 13 the radius of the fluid mass is reduced so increasing the centrifugal force and causing a pressure drop which acts to throttle the main flow between inlet 12 and outlet 13. The amount of throttling can be increased or decreased by varying the relative amounts of control flow through the nozzle sets 17a and 17 b, between maximum flow through set 17a and zero flow through set 17b (maximum throttling) and zero flow through set 17a with maximum flow through set 17b (minimum throttling). The control flow can be varied remotely or by way of one or more fluidic devices dependent upon the parameters of a process in which the amplifier described is incorporated.

The converging section 18 of the outlet 13 and the diverging section 19 which follows it act as a flow diffuser. Thus, when little or no resultant spinning of the main fluid flow occurs after it has passed through the chamber 11, the diverging section 19 allows the main flow to recover as far as is possible, the conditions of velocity and pressure which obtained at entry to inlet 12. To improve outlet conditions the outlet is designed so as to reduce flow resistance in the no spin condition. This may be done by radiusing the converging section 18 so as to eliminate flow separation in the low resistance (no spin) condition. Also the surface of the body 14 should be shaped to conform with the surface of the section 18. This shaping should give a cross-section to the flow such that expansion of flow is minimized until after the throat of the diffuser is reached.

Figure 3:
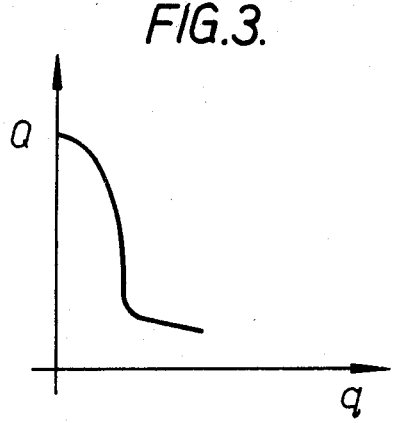
FIG. 3 is a graph showing the relationship between control and main fluid flow through the amplifier shown in FIGS. 1 and 2.

FIG. 3 indicates graphically the qualitative relationship between main flow $Q$ and control flow $q$ (both measured in fluid quantity per unit of time).

We claim:

1. A vortex amplifier comprising a chamber having co-axial inlet and outlet ducts for a main fluid flow, in which chamber is disposed a flow shaper body which confines fluid flow through the chamber to the outer part of said chamber, flow directing means disposed in the chamber for imparting a rotary component of flow to fluid passing through the chamber, and at least one control port for directing a control flow of fluid separate from the main fluid flow tangentially into the chamber to interact with main fluid flow to which a rotary component has been applied by said flow directing means.

2. A vortex amplifier as claimed in claim 1 wherein two sets of control ports are provided, one set for directing control flow in a clockwise direction and the other set for directing control flow in an anti-clockwise direction.

3. A vortex amplifier as claimed in claim 1 wherein the flow directing means includes vanes mounted above the flow shaper body and inclined relative to the longitudinal axis of the chamber.

4. A vortex amplifier as claimed in claim 1 wherein the outlet duct forms the throat of a flow diffuser.

5. A vortex amplifier as claimed in claim 4 wherein the converging section leading to the throat of the flow diffuser is radiused to minimize flow resistance under conditions of low resistance to flow.

6. A vortex amplifier as claimed in claim 5 wherein the surface of the flow shaper body is shaped to conform with the surface of the converging section leading to the throat of the flow diffuser and thereby to give a cross section to flow over said surfaces which minimizes expansion of flow until after the throat of the diffuser is reached.

* * * * *

Disclaimer 3,664,360.—*Joseph Kenneth Royle*, Bakewell, *John Grant*, Risley, and *Jack Alexander Golder*, Lower Walton, England. FLUID FLOW CONTROL DEVICES. Patent dated May 23, 1972. Disclaimer filed Oct. 31, 1972, by the assignee, *United Kingdom Atomic Energy Authority*.

Hereby enters this disclaimer to claims 1 and 3 of said patent.

[*Official Gazette January 30, 1973.*]